US010529000B1

(12) United States Patent
Gokkaya et al.

(10) Patent No.: US 10,529,000 B1
(45) Date of Patent: Jan. 7, 2020

(54) SYSTEM AND METHOD FOR AUTOMATICALLY TAGGING PRODUCTS FOR AN E-COMMERCE WEB APPLICATION AND PROVIDING PRODUCT RECOMMENDATIONS

(71) Applicant: Udemy, Inc., San Francisco, CA (US)

(72) Inventors: Beliz Gokkaya, San Francisco, CA (US); Lawrence Lee Wai, Mountain View, CA (US)

(73) Assignee: Udemy, Inc., San Francisco, CA (US)

( * ) Notice: Subject to any disclaimer, the term of this patent is extended or adjusted under 35 U.S.C. 154(b) by 421 days.

(21) Appl. No.: 15/439,855

(22) Filed: Feb. 22, 2017

(51) Int. Cl.
| | |
|---|---|
| *G06Q 30/06* | (2012.01) |
| *G06F 16/958* | (2019.01) |
| *G06Q 30/02* | (2012.01) |
| *H04L 29/08* | (2006.01) |
| *H04L 12/26* | (2006.01) |

(52) U.S. Cl.
CPC ....... *G06Q 30/0631* (2013.01); *G06F 16/958* (2019.01); *G06Q 30/0201* (2013.01); *G06Q 30/0625* (2013.01); *H04L 43/04* (2013.01); *H04L 67/02* (2013.01); *H04L 67/22* (2013.01)

(58) Field of Classification Search
CPC .......... G06Q 30/0631; G06Q 30/0625; G06Q 30/0201; G06F 16/958; G06F 16/5866; H04L 67/02; H04L 67/22; H04L 43/04
USPC ............................................. 705/26.7, 26.62
See application file for complete search history.

(56) References Cited

U.S. PATENT DOCUMENTS

| | | | |
|---|---|---|---|
| 7,526,458 B2* | 4/2009 | Flinn | G06N 5/048 706/12 |
| 7,693,817 B2* | 4/2010 | Dumais | H04L 51/34 707/999.002 |

(Continued)

OTHER PUBLICATIONS

Mabroukeh, Nizar R.. , "SemAware: An Ontology-Based Web Recommendation System" Published in a Dissertation Submitted to the Faculty of Graduate Studies Through Computer Science at the University of Windsor, Windsor, Ontario, Canada in the year 2011.*

(Continued)

*Primary Examiner* — Yogesh C Garg
(74) *Attorney, Agent, or Firm* — McDermott Will & Emergy LLP

(57) ABSTRACT

Systems and methods for automatically tagging product for an e-commerce web application and providing product recommendations. Product information related to products is stored and the products are searchable via search queries. Results for the search queries are generated. Interactions of the users with the results for the search queries are monitored. Semantic tags are associated with the products based on the search queries and the results for the search queries. Weighted links between the products and the semantic tags are determined based on the interactions of the users with the results for the search queries. Users' interactions with the product information and/or the product are monitored and user links between the semantic tags and the users are determined based on the weighted links between the products and the semantic tags and the users' interactions. Product recommendations are determined based on the user links and the weighted links.

22 Claims, 6 Drawing Sheets

(56) References Cited

U.S. PATENT DOCUMENTS

| | | | | |
|---|---|---|---|---|
| 8,832,091 B1* | 9/2014 | Bhagat | ............... | G06F 16/9024 |
| | | | | 707/723 |
| 8,850,329 B1* | 9/2014 | Hill | ................. | G06F 17/2247 |
| | | | | 715/745 |
| 9,323,426 B2* | 4/2016 | Yang | ................. | G06F 16/9535 |
| 10,108,720 B2* | 10/2018 | Chen | ................. | G06F 16/9535 |
| 2007/0203872 A1 | 8/2007 | Flinn | | |
| 2009/0119254 A1* | 5/2009 | Cross | ................. | G06F 16/9535 |
| 2010/0004975 A1* | 1/2010 | White | ................ | G06Q 30/02 |
| | | | | 705/7.29 |
| 2010/0070448 A1* | 3/2010 | Omoigui | ............ | H01L 27/1463 |
| | | | | 706/47 |
| 2010/0082576 A1* | 4/2010 | Walker | ................ | G06F 16/958 |
| | | | | 707/706 |
| 2011/0213655 A1 | 9/2011 | Henkin | | |
| 2012/0089581 A1* | 4/2012 | Gupta | ................. | G06Q 10/00 |
| | | | | 707/706 |
| 2014/0143329 A1* | 5/2014 | Garg | ................. | H04L 67/306 |
| | | | | 709/204 |
| 2015/0227972 A1* | 8/2015 | Tang | ................. | G06Q 30/0255 |
| | | | | 705/14.53 |
| 2015/0348131 A1* | 12/2015 | Lee | ................... | G06F 16/5866 |
| | | | | 705/14.7 |
| 2017/0053032 A1* | 2/2017 | Liongosari | ........... | G06F 16/285 |

OTHER PUBLICATIONS

2010-K34568, Aug. 2010, Derwent, Bonabeau et al.*
2010-N71499, Nov. 2010, Derwent, Braunwarth M.S.*

* cited by examiner

SYSTEM AND METHOD FOR AUTOMATICALLY TAGGING PRODUCTS FOR AN E-COMMERCE WEB APPLICATION AND PROVIDING PRODUCT RECOMMENDATIONS

FIELD OF THE INVENTION

The disclosure relates to systems and methods configured for automatically tagging products for an e-commerce web application and providing product recommendations.

BACKGROUND OF THE INVENTION

E-commerce web platforms often offer large quantities and varieties of products to users. The products may include online media content and/or physical products. Users can typically search the products via search queries. Metadata associated with the products may be stored and/or accessible via databases. The metadata may include tags (e.g., keywords and/or terms) that describe the products and enable them to be found when they are searched. Generally, e-commerce application administrators and/or uses select the tags for products manually and/or via collaborative tagging.

SUMMARY

The disclosure herein relates to system for automatically tagging online content. The present application describes a system that may automatically tag products for an online marketplace. The system may use the tags in a recommendation engine to recommend one or more products to one or more users. The products may include one or more online content items and/or other products. By way of non-liming example, the products may include online courses the users can take via the Internet.

A set of semantic tags may be determined based on previous search query data from users. For example, in some implementations, search terms included in search queries may be clustered based on common or similar hits (e.g., results). Using a probabilistic model, the semantic tags may be associated with products. The semantic tags may be associated with the products via one or more weighted links. The weighted links may include weighted links between individual ones of the products and the semantic tags, and/or weights between individual ones of the semantic tags and the products. The weights of the weighted links may be determined based on interactions of the users with the results of the search queries, the products, and/or other information. The users' interactions between the products and/or the information related to the products (e.g., all interactions including impressions, clicks, enrollment, completion, stated feedback, etc.) of users with individual products (e.g., user-product relationships) are monitored. The users' interactions between individual ones of the users and individual ones of the products, along with the weighted links between individual ones of the products and the semantic tags may be used to determine user-links between users and the semantic tags. The links between the users and the semantic tags may be weighted. The system may determine and/or provide product recommendations based on the user links between the semantic tags and the users, weighted links between the semantic tags and the products, and/or other information.

A system configured to automatically tag products for an e-commerce website and/or provide product recommendations may include one or more server(s) and/or one or more client computing platforms. The server(s) and the client computing platform(s) may communicate in a client/server configuration and/or other configuration. The server(s) may include one or more processors configured by machine-readable instructions to execute computer program components. The computer program components may include one or more of: a product component, a query component, a semantic tag component, a user link component, a recommendation component, and/or other components.

The product component may be configured to store product information related to products. The products may be available for purchase and/or consumption by the users via an e-commerce website. The product information related to a given product may include information describing the given product, the given product's association with one or more semantic tags, and/or other information related to the given product.

The products may be searchable via search queries. The search queries may include one or more search terms entered by the users when searching for a given product and/or a given type of product. The query component may be configured to receive the search queries over a network from one or more client computing platforms.

The query component may be configured to generate results for the search queries. The results for the search queries may be generated based on the stored information related to the products. The results for the search queries may include the product information that specifies the products that satisfy the search queries.

The query component may be configured to provide the results for the search queries to the users via the client computing platforms. The results for the search queries may be served to the client computing platforms associated with the users that submitted the search queries. Providing the results for the search queries may include presenting the product information related to the products that satisfy the search queries via the client computing platforms.

The query component may be configured to monitor interactions of the users with the results for the search queries. The interactions of the users with the results for the search queries may include one or more of: viewing the product information related to one or more of the products that satisfy the search queries but not clicking on the product information, clicking on the product information related to one or more of the products that satisfy the search queries but not purchasing the product, clicking on the product information related to one or more of the products that satisfy the search queries but not enrolling-in or signing-up for one or more of the products, and/or otherwise interacting with the product information included in the results for the search queries.

The semantic tag component may be configured to associate semantic tags with the products. One or more semantic tags may be associated with the products based on the search queries, the results for the search queries, and/or other information. By way of non-limiting example, the products specified by the results for a given search query may be associated with the same and/or similar semantic tags. As such, the products specified by the product information included in the results for the same or similar search queries may be associated with one or more of the same semantic tags.

The semantic tag component may be configured to determine weighted links. The weighted links may include weighted links between individual ones of the products and the semantic tags, and/or individual ones of the semantic tags and the products. The weighted links may be determined based on the interactions of the users with the results for the search queries. The weighted links may represent how relevant a given semantic tag is to a given product, how similar given products are, indicate how likely the search queries of a user searching for the given product are to include search terms with the given semantic tag, and/or other information.

In some implementations, determining the weighted links includes determining weights for the weighted links. For example, responsive to the first product and a second product satisfying a first search query, such that first results include first product information related to the first product and second product information related to the second product, and responsive to the interactions of the users with first information related to the first product being more interactive than the interactions of the users with the second information related to the second product and/or more users interacting with the first information related to the first product than the second information related to the second product; the weight determined for the first weighted link between the first product and the first tag may be higher than the weight determined for a second weighted link between the second product and the first tag.

The user link component may be configured to monitor users' interactions with the product information and/or the products. The users' interactions with the product information and/or the products may include one or more of: clicking and not clicking on a product for a given impression, enrolling-in and/or signing up for one or more of the products, completing and/or achieving a benchmark associated with one or more of the products, purchasing one or more of the products, returning one or more of the products, enrolling-in or signing-up for a product but not completing the product, and/or other users' interactions with the product information and/or the products.

By way of non-limiting example, a first user's interaction with first product information and/or a first product may be monitored. The first product may be associated with a first semantic tag. There may be a first weighted link between the first product and the first semantic tag.

The user link component may be configured to determine user links between the semantic tags and the users. The user links may be determined based on the weighted links between the semantic tags and the products, the users' interactions with the product information and/or the products, and/or other information. As such, continuing the example, a first user link between the first user and the first semantic tag may be determined based on the first user's interaction with the first product information and/or the first product, the first weighted link between the first product and the first semantic tag, and/or other information.

The recommendation component may be configured to determine product recommendations based on the user links between the semantic tags and the users, weighted links between the semantic tags and the products, and/or other information. Continuing the example, a first recommendation maybe determined for the first user based on the first user link, a weighted link between the first semantic tag and one or more products, and/or other information.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
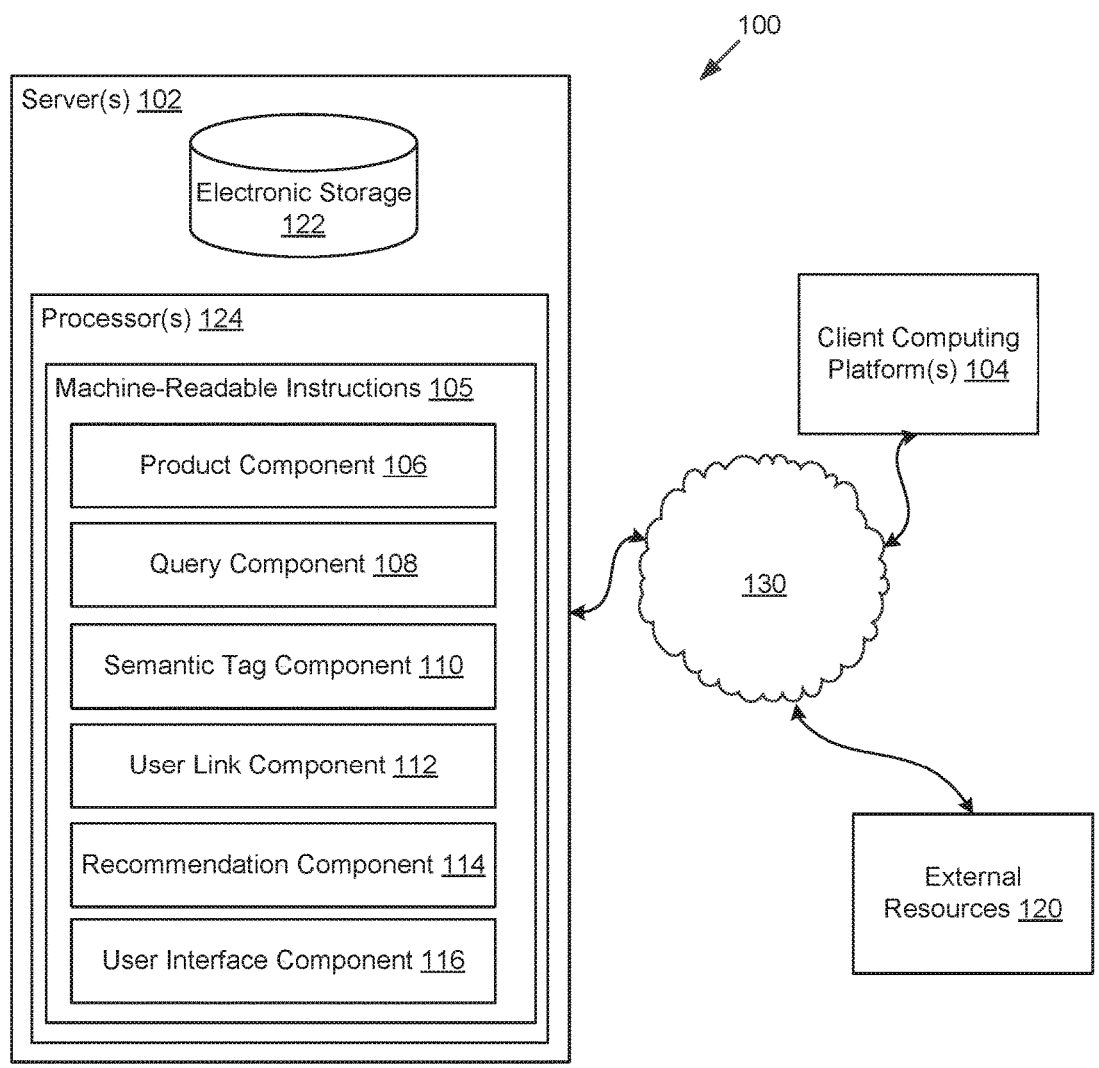
FIG. 1 illustrates a system configured for automatically tagging products for an e-commerce web application and providing product recommendations, in accordance with one or more implementations.

FIG. 1 illustrates an example system 100 that is configured for automatically tagging products for an e-commerce web application and providing product recommendations. The system may be configured to store product information related to products for an e-commerce web application. The products may be searchable via search queries. The system may generate results for the search queries based on the stored information related to the products. The system may provide the results of the search queries to the users via the client computing platforms. The system may monitor interactions of the users with the results for the search queries. Based on the search queries and the results for the search queries, the system may associate semantic tags with individual ones of the products. The system may determine weighted links between individual ones of the products and the semantic tags, and/or between individual ones of the semantic tags and the products. The weighted links may be determined based on the interactions of the users with the results for the search queries. The weighted links may also be used to understand product similarity. For example, weighted links between individual ones of the semantic tags and the products may indicate similarity between the products. Users' interactions with the product information and/or the products may be monitored by the system to determine user links between the semantic tags and the users. The user links may be determined based on the users' interactions with the product information and/or the products, the weighted links (e.g., between the products and the semantic tags, and/or between the semantic tags and the products), and/or other information. In some implementations, the system may update one or more weighted links based on other weighted links, user links, and/or other information.

The system may determine product recommendations based on the user links, the weighted links, and/or other information.

In previously existing methods, new products are tagged with semantic tags manually by the user uploading/adding the new products and/or information related to the new products, an administrator managing the online marketplace for the products, and/or other users. These previously existing manual methods may be inconsistent, inconvenient, slow, inefficient, inaccurate, and limited. For example, not all users will associate the semantic tags with the products in the same way. And, the user determining the semantic tags to associate with a given product is limited to the information they possess for that individual product and does not take into consideration: other similar products, past search queries, how users interacted with past search queries, which semantic tags are more successful and/or relevant than other related tags, etc. Merely associating semantic tags with the products according to previously existing methods fails to consider how relevant a given semantic tag is to a particular product (e.g., to what degree of relevancy, and/or how likely is a user searching for the given product is to enter search terms that will include the given semantic tag compared to another semantic tag, where both semantic tags may be associated with the given product). Known methods also fail to utilize users' relationships and/or interactions with the products, in addition to the associations with semantic tags, to provide better recommendations. Manually entering semantic tags for products is also static, does not improve, and/or is not updated to incorporate additional information for improving associations between the products and the semantic tags, and/or between the semantic tags and the users as it is obtained.

As illustrated in FIG. 1, system 100 may include one or more server(s) 102, one or more client computing platform(s) 104, electronic storage 122, one or more external resources 120, one or more physical processor(s) 124 configured to execute machine-readable instructions 105, one or more computer program components 106-114, and/or other components.

One or more physical processor(s) 124 may be configured to execute machine-readable instructions. Executing machine-readable instructions 105 may cause the one or more physical processor(s) 124 to automatically tag products for an e-commerce web application and provide product recommendations. Machine-readable instructions 105 may include one or more computer program components such as a product component 106, a query component 108, a semantic tag component 110, a user link component 112, a recommendation component 114, and/or other components.

In some implementations, server(s) 102 may be configured to provide remote hosting of the features and/or functions of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a laptop, a tablet computer, a desktop computer, a cellular telephone, a smartphone, a digital camera, a television set-top box, smart TV, a gaming console, and/or other platforms. Users may enter search terms included in search queries via the client computing platform(s) 104 to locate and/or identify one or more products. Dissimilar to locating products within a physical store, user satisfaction and success in locating the products via an e-commerce web application depends on the accuracy, consistency, and effectiveness of the search results provided in response to search queries. Physical stores do not employ machine learning techniques to consistently improve accuracy and relevancy of search query results based on past search queries, interactions of the user and/or other users with the results of past search queries, and/or other information. E-commerce web applications also provide unique opportunities to provide more relevant and/or user specific recommendations, unlike physical stores, based on the specific user as well as the interactions of other users.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Product component 106 may be configured to store product information related to products. The products may include one or more digital content items and/or physical items available for users to purchase and/or consume. In some implementations, the content items may include online courses. The online courses may include online education courses comprising one or more videos, audio files, documents, images, and/or other media content. The products may be available for purchase and/or consumption by the users via an e-commerce website.

The product information related to a product may include information describing the product, the product's associations with one or more semantic tags, and/or other information related to the product. The information describing the product may include a title or name of the product, a description of the product, a topic associated with the product, a price of the product, a size and/or duration of the product, a ranking or review associated with the product, a difficulty level associated with the product, and/or other information describing the product. The product's associations with one or more semantic tags (e.g., metadata) may include the semantic tags associated with the product, the weighted links between the product and the semantic tags, and/or other information. The product information may be stored in one or more locations within and/or accessible by system 100. By way of non-limiting example, the product information may be stored in electronic storage 122. The one or more components of system 100 may be configured to communicate with electronic storage 122 and/or other storage locations to obtain, update, and/or communication the product information.

In some implementations, sematic tag information may be stored in one or more locations within and/or accessible by system 100. The semantic tag information may include associations of the semantic tags, semantic tag information, the search queries and/or clusters associated with the semantic tags, and/or other information.

Users may search the products via search queries. The search queries may include one or more search terms. Users may enter one or more search terms included in the search queries via a graphical user interface on one or more client computing platforms. Query component 108 may be configured to receive the search queries over a network from one or more client computing platforms.

Query component 108 may be configured to generate results for the search queries. The results for the search queries may be generated based on the stored information related to the products. The results for the search queries may include the product information that specifies the products that satisfy the search queries. Products that satisfy the search queries may be identified based on the metadata available on the product, one or more semantic tags associated with the products, the weighted links between individual ones of the semantic tags and the products, the weighted links between individual ones of the products and the semantic tags, and/or other information.

Query component 108 may be configured to provide the results for the search queries to the users via the client computing platforms. The results for the search queries may be served to the client computing platforms associated with the users that submitted the search queries. Query component 108 may be configured to effectuate presentation of an interface in which the results, including the product information related to the products that satisfy the search queries, are presented on one or more client computing platforms. In some implementations, the results may be presented in a manner and/or order specific to the user that submitted the search query.

Query component 108 may be configured to monitor interactions of the users with the results for the search queries. The interactions of the users with the results for the search queries may include one or more of: an impression and/or viewing of the product information related to one or more of the products that satisfy the search queries, hovering a mouse over the product information related to one or more of the products that satisfy the search queries (e.g., 'mousing over'), clicking on the product information related to one or more of the products that satisfy the search queries, enrolling and/or signing up for one or more of the products, completing and/or achieving a benchmark associated with one or more of the products, purchasing one or more of the products, and/or otherwise positively interacting with the product information included in the results for the search queries. In some implementations, the interactions of the users with the results for the search queries may include one or more of: viewing the product information related to one or more of the products that satisfy the search queries but not clicking on the product information, clicking on the product information related to one or more of the products that satisfy the search queries but not purchasing the product, clicking on the product information related to one or more of the products that satisfy the search queries but not enrolling-in or signing-up for one or more of the products, and/or otherwise negatively interacting with the product information included in the results for the search queries. In some implementations, positive interactions and/or negative interactions may be monitored and/or used to make one or more determinations related to the results of the search queries, the semantic tags, the weighted links, the user tags, and/or other determinations.

In some implementations, semantic tag component 110 may be configured to determine one or more semantic tags to associate with the products. Determining the semantic tags may include clustering similar ones of the search queries based on the results for the search queries. For example, search queries having results that are the same and/or similar may be clustered. As such, the results for individual ones of the search queries within a cluster may be the same and/or similar. In some implementations, semantic tag component 110 may determine a set of semantic tags based on previous search queries and results for the previous search queries. In one non-limiting example, the search terms included in the search queries may be normalized to generate the semantic tags. Semantic tag component 110 may cluster the generated semantic tags via a machine learning algorithm based on common or similar results (i.e., hits). By way of non-limiting example, if the results for different search queries are the same and/or similar (e.g., one or more courses overlap), the algorithm may cluster the semantic tags used in the different search queries as related to one another. By way of non-limiting use example, if users that search "Java" and "Java Programming" receive the same and/or similar hits (e.g., the same courses are provided as a result of the query), Java and Java Programming may be clustered together. The algorithm may assign topics to the clusters (e.g., the most important search query and/or tag within a cluster). By way of non-limiting example, the search queries may be normalized and used as tags. Continuing the non-limiting example, responsive to a cluster having two or more search queries, a tag for the given cluster may be selected as the search query having the heighted importance in the cluster (such that the normalized version of this search query may become the tag (e.g., topic) associated with the cluster). The semantic tags are determined and/or generated based on the search queries. In some implementations, the semantic tags may be continuously generated based on the search terms the users enter.

Individual search queries within a cluster may be ranked and/or weighted based on importance. Importance of the search queries may be determined by link analysis methods. If a cluster consists of two or more search queries, a tag may be assigned to the cluster based on the search query having the highest relative importance within the cluster. By way of non-limiting example, "Java" might be relatively more important than Java Programming. As such, for example, "Java" may be weighted more heavily in associating the tags to the products.

Semantic tag component 110 may be configured to associate semantic tags with the products. The semantic tags may be associated with the products based on one or more of the search queries, the results for the search queries, the interactions of the user's with the results for the search queries, and/or other information. By way of non-limiting example, the products specified by the results for a given search query may the associated with the same and/or similar semantic tags. As such, the products specified by the product information included in the results for the same or similar search queries may be associated with one or more of the same semantic tags.

Semantic tag component 110 may be configured to determine weighted links between individual ones of the products and the semantic tags, and/or between individual ones of the semantic tags and the products. The weighted links may be determined based on the interactions of the users with the results for the search queries and/or the products, the importance of the link between the semantic tag and the search query, and/or other information. The interactions of the users with the results for the search queries may include one or more positive interactions, and/or one or more negative interactions. The weighted links may represent how relevant a given semantic tag is to a given product, how relevant a given product is to a given semantic tag, how likely the search queries of a user searching for the given product are to include search terms with and/or leading to the given semantic tag, how similar one or more products are to each other, and/or other information. The interactions of the users with the results of the search queries may indicate how relevant a given product is to one or more search terms and/or one or more semantic tags. The weighted links may be continuously determined and/or updated according to a probabilistic model based on the results for user search queries and/or the interactions of the users with the results.

The positive interactions of the users with the results for the search queries may include one or more of: an impression and/or viewing of the product information related to one or more of the products that satisfy the search queries, hovering a mouse over the product information related to one or more of the products that satisfy the search queries (e.g., 'mousing over'), clicking on the product information related to one or more of the products that satisfy the search queries, enrolling and/or signing up for one or more of the products, completing and/or achieving a benchmark associated with one or more of the products, purchasing one or more of the products, and/or otherwise positively interacting with the product information included in the results for the search queries. By way of non-limiting example, semantic tag component 110 may be configured to determine weighted links between individual ones of the products and individual ones of the semantic tags, and/or individual ones of the semantic tags and the products based on an amount of users that clicked on, purchased, and/or enrolled in one product versus the other products specified by the product information included in the results for one or more search queries. In some implementations, determining the weighted links may include determining weights for the weighted links. As such, the weights may be continuously determined and/or updated according to the probabilistic model based on the results for user search queries and/or the interactions of the users with the results. The weights may include one or more strength quantities, strength multipliers, rankings, and/or other distinctions indicating an order and/or ranking position of the weighted links. In some implementations, the weights may include conditional probabilities between 0 and 1.

By way of non-limiting example, responsive to the first product and a second product satisfying a first search query, such that first results include first product information related to the first product and second product information related to the second product, and responsive to the interactions of the users with first information related to the first product being more interactive than the interactions of the users with the second information related to the second product and/or more users interacting with the first information related to the first product than the second information related to the second product; the weight determined for the first weighted link between the first product and the first tag may be higher than the weight determined for a second weighted link between the second product and the first tag. The semantic tags may include metadata stored in or more databases accessible by semantic tag component 110. In some implementations, the semantic tags may be included in the product information stored.

In some implementations, semantic tag component 110 may be configured to determine a degree of similarity between two or more products based on one or more of a single semantic tag associated with the two or more products, the weighted links between the single semantic tag and the two or more products, the semantic tags associated with the two or more products, the weighted links between the two or more products and the semantic tags, and/or other information. By way of non-limiting example, if a given semantic tag is associated with three products, the three products may have a high degree of similarity. Responsive to two of the three products having higher weighted links between the given semantic tag and the two products, the two of the three products may have an even higher degree of similarity between each other. By way of another non-limiting example, if two products are associated with similar semantic tags, and the weighted links between the two products and the corresponding similar semantic tags are similar weights, the two products may be determined to have a high degree of similarity. In some implementations, the determined degree of similarity may be quantified and used to provide improved product recommendations to users.

Figure 2:
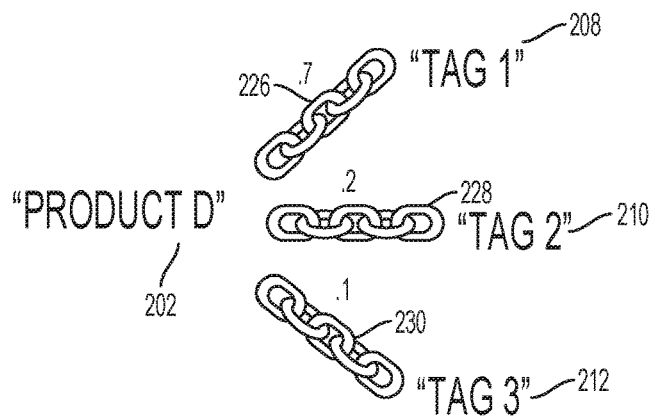
FIG. 2 illustrates a representation of weighted links between individual products and semantic tags, in accordance with one or more implementations.
Figure 2:
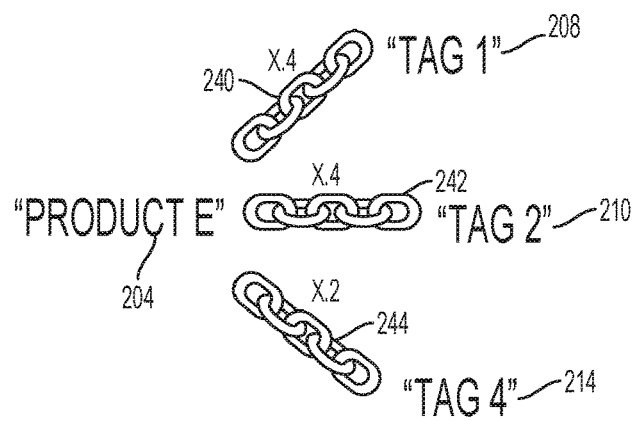
Figure 2:
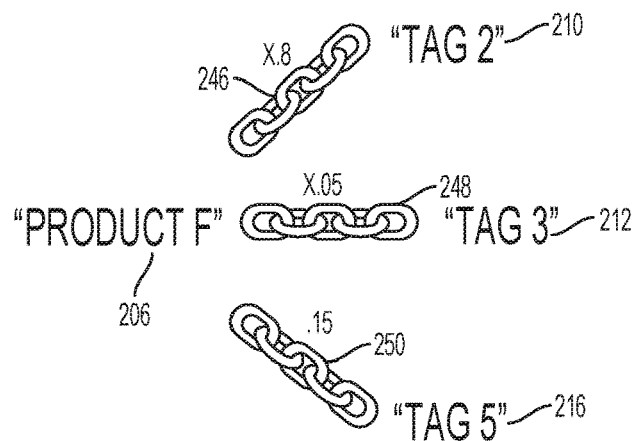

FIG. 2 illustrates a representation of the weighted links between products and semantic tags, in accordance with one or more implementations. Product D 202, Product E 204, and/or Product F 206 may be associated with one or more semantic tags 208-216. Product D 202, Product E 204, and/or Product F 206 may be associated with one or more semantic tags 208-216 via one or more weighted links 226-250. As illustrated in FIG. 2, Product D 202 may be associated with Tag 1 208, Tag 2 210, Tag 3 212, and/or other tags (not illustrated in FIG. 2). Product E 204 may be associated with Tag 1 208, Tag 2 210, Tag 4 214, and/or other tags (not illustrated in FIG. 2). Product F 206 may be associated with Tag 2 210, Tag 3 212, Tag 5 216, and/or other tags (not illustrated in FIG. 2).

Product D 202 may be associated with Tag 1 208 via weighted link 226. Weighted link 226 may have a weight of 0.7. Product D 202 may be associated with Tag 2 210 via weighted link 228. Weighted link 228 may have a weight of 0.2. Product D 202 may be associated with Tag 3 212 via weighted link 230. Weighted link 230 may have a weight of 0.1.

Product E 204 may be associated with Tag 1 208 via weighted link 240. Weighted link 240 may have a weight of 0.4. Product E 204 may be associated with Tag 2 210 via weighted link 242. Weighted link 242 may have a weight of 0.4. Product E 204 may be associated with Tag 4 214 via weighted link 244. Weighted link 244 may have a weight of 0.2.

Product F 206 may be associated with Tag 2 210 via weighted link 246. Weighted link 246 may have a weight of 0.8. Product F 206 may be associated with Tag 3 212 via weighted link 248. Weighted link 248 may have a weight of 0.05. Product F 206 may be associated with Tag 5 216 via weighted link 250. Weighted link 250 may have a weight of 0.15.

The weights of the weighted links may indicate a strength of the association between the product and a given tag (e.g., how relevant a given semantic tag is to a given product, and/or indicate how likely (e.g., a probability) the search queries of a user searching for the given product are to include search terms with the given semantic tag, etc.). By way of non-limiting example, the results for a search query including search terms specifying, associated with, and/or within the same cluster as Tag 1 208 may include Product D 202 and Product E 204. Tag 1 may be more relevant to Product D 202 than Tag 2 (e.g., based on the weight for weighted link 226 being more than the weight for weighted link 228). Tag 3 230 may be the least relevant tag to Product D than both Tag 1 208 and Tag 2 210. By way of another non-limiting example, for past search queries including search terms specifying, associated with, and/or within the same cluster as Tag 1 208, and the users may have been relatively more interactive with Product D 202 than Product E 204, and/or more users may have interacted with Product D 202 than interacted with Product E 204.

In some implementations, the system (the same as or similar to system 100 illustrated in FIG. 10) may determine Product D 202 and Product E 204 are similar to one another based on their association with Tag 1 208 and Tag 2 210.

Figure 3:
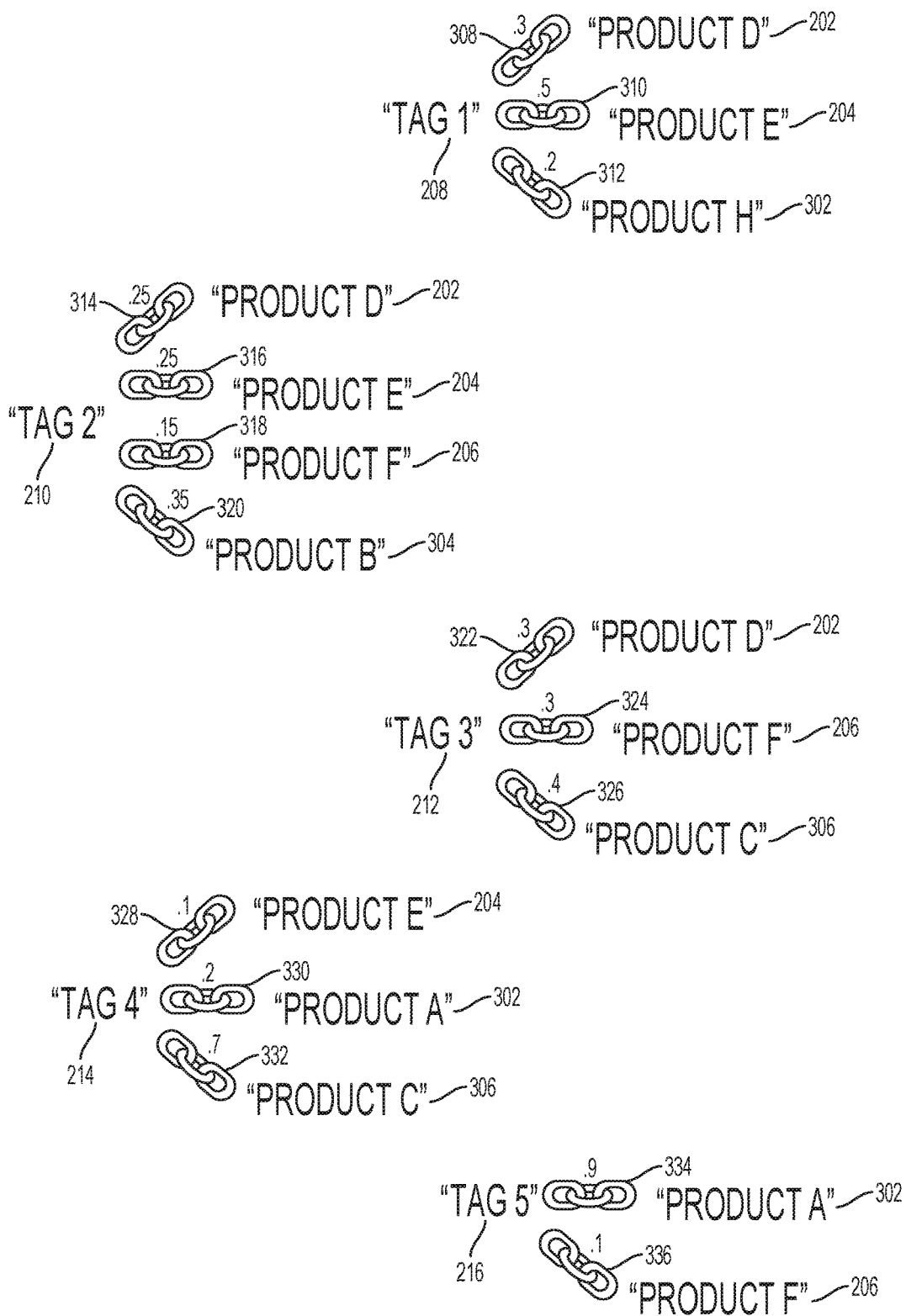
FIG. 3 illustrates a representation of weighted links between individual semantic tags and products, in accordance with one or more implementations.

FIG. 3 illustrates a representation of the weighted links between tags and products, in accordance with one or more implementations. One or more semantic tags 208-216 may be associated with one or more products via weighted links 308-336. Tag 1 208 may be associated with one or more of Product D 202 via weighted link 308, Product E 204 via weighted link 310, Product A 302 via weighted link 312, and/or other products via other weighted links. Tag 2 210 may be associated with one or more of Product D 202 via weighted link 314, Product E 204 via weighted link 316, Product F 206 via weighted link 318, Product B 304 via weighted link 320, and/or other products via other weighted links. Tag 3 212 may be associated with one or more of Product D 202 via weighted link 322, Product F 206 via weighted link 324, Product C 306 via weighted link 326, and/or other products via other weighted links. Tag 4 214 may be associated with one or more of Product E 204 via weighted link 328, Product A 302 via weighted link 330, Product C 306 via weighted link 332, and/or other products via other weighted links. Tag 5 216 may be associated with one or more of Product A 302 via weighted link 334, Product F 206 via weighted link 336, and/or other products via other weighted links.

The weights of the weighted links may indicate a probability of correspondence between the semantic tag and the given product(s) (e.g., how likely it is a given semantic tag is relevant/corresponds to a given product, how likely it is products associated with the same semantic tags correspond and/or are similar to each other, a probability that a given user will select one of the products associated with a tag responsive to the user entering a search query including search terms specifying, associated with, and/or within the same cluster as the tag, etc.). Weighted links 308-336 may comprise probabilities.

In some implementations, weighted links 308-336 may indicate similarity between semantic tags. By way of non-limiting example, weighted link 314 between Tag 2 210 and Product D 202, weighted link 316 between Tag 2 210 and Product E 204, weighted link 308 between Tag 1 208 and Product D 202, and/or weighted link 310 between Tag 1 208 and Product E 204 may indicate a high degree of similarity between Product D 202 and Product E 204.

Regarding FIGS. 2 and 3, the weighted links between individual ones of the products and the semantic tags (e.g., as illustrated in FIG. 2), and/or the weighted links between individual ones of the semantic tags and the products (e.g., as illustrated in FIG. 3) may describe and/or indicate a probability of correspondence between an originating entity (e.g., individual ones of the semantic tags, and/or individual ones of the products) and a target entity (e.g., one or more products, and/or one or more semantic tags). The weighted links may include probabilities representing a likelihood that a given originating entity corresponds to a given target entity. The weighted links between the same two entities (e.g., a given product and a given semantic tag) may be different when one of the two entities is the originating entity compared to when the other entity is the originating entity.

For example, the weighted link 226 (see e.g., FIG. 2) between Product D 202 (an originating entity) and Tag 1 208 (a target entity), may be different that the weighted link 308 (see e.g., FIG. 3) between Tag 208 (an originating entity) and Product D 202 (a target entity). Continuing the example, weighted link 226 and weighted link 308 may both be links between the same entities, but may represent different likelihoods of correspondence based on which entity is the originating entity and/or which is the target entity. To illustrate, weighted link 226 between Product D 202 and Tag 1 208 may indicate a 0.7 probability (e.g., a 70% probability) that Tag 1 208 corresponds to Product D (compared to a 0.2 probability (20%) for Tag 2 210 and a 0.1 probability (10%) for Tag 3 212). Continuing the example illustration, weighted link 308 between Tag 1 208 and Product D 202 may indicate a 0.3 probability (e.g., a 30% probability) that Product D 202 corresponds to Tag 1 208 (compared to a 0.5 probability (50%) for Product E 204, and/or a 0.2 probability (20%) for Product A 302). As such, the probability that Product D 202 corresponds to Tag 1 208 may be different (e.g., higher (as illustrated) or lower) than the probability that Tag 1 208 corresponds to Product D 202. Therefore, the weighted links between individual ones of the products and the semantic tags, and/or the weighted links between individual ones of the semantic tags and the products may be different, even if they are linking the same given semantic tag and given product.

Returning to FIG. 1, user link component 112 may be configured to monitor users' interactions with the product information and/or the products. Monitoring the users' interactions with the product information and/or the products may be separate and distinct from monitoring the interactions of the users with the results for the search queries. By way of non-limiting example, the users' interactions with the product information and/or the products may be monitored responsive to the users clicking on and/or selecting the product information associated with one or more the products, and/or one or more of the products. As such, the users' interactions with the product information and/or the products may indicate how interested, engaged, and/or relevant a given product was to a user after they have selected and/or considered it from the results for their search query.

The users' interactions with the product information and/or the products may include one or more of the positive feedback: clicking on a product for a given impression, enrolling-in and/or signing up for one or more of the products, completing and/or achieving a benchmark associated with one or more of the products, purchasing one or more of the products, returning one or more of the products, enrolling-in or signing-up for a product but not completing the product, and/or other users' interactions with the product information and/or the products.

In some implementations, the negative interactions of the users with the product information and/or the products may include one or more of: viewing the product information related to one or more of the products but not clicking on the product information or the product, clicking on the product information related to one or more of the products but not purchasing the product, clicking on the product information related to one or more of the products but not enrolling-in or signing-up for one or more of the products, and/or otherwise negatively interacting with the product information.

By way of non-limiting example, a first user's interaction with first product information and/or a first product may be monitored. The first product may be associated with a first semantic tag. There may be a first weighted link between the first semantic product and the first semantic tag. The first user's interaction with the first product information and/or the first product may, for example, include the first user selecting a first course (e.g., the first product), the first user enrolling in the first course, the first user completing the first course, the first user providing stated feedback (e.g., a review, a comment, a rating, etc.) for the first course and/or other interactions of the first user with the first product information and/or the first product.

User link component 112 may be configured to determine user links between the semantic tags and the users. The user links may be determined based on the weighted links between individual ones of the products and the semantic tags, the users' interactions with the product information and/or the products, and/or other information. The user links may, for example, represent a given user's association and/or link to a given semantic tag based on their previous interactions with one or more given products, and/or the strength of associations between the one or more given products and the given semantic tag. By way of non-limiting example, a first user link between the first user and the first semantic tag may be determined by user link component 112. The first user link may be determined based on the first user's interaction with the first product information and/or the first product, the first weighted link between the first product and the first semantic tag, and/or other information.

One or more of the semantic tags associated with the products, the weighted links between individual ones of the products and the semantic tags, the weighted links between individual ones of the semantic tags and the products, and/or the user links between the users and the semantic tags may be determined continuously. Therefore, one or more of the weighted links and the user links may be determined dynamically by system 100. System 100 may employ machine learning techniques to continuously update the semantic tags associated with the products, the weighted links between the semantic tags and the products, the user links between the semantic tags and the users, and/or other information. As such, system 100 may automatically tag products for an e-commerce web application and/or provide product recommendations more efficiently and more effectively than existing methods.

In some implementations, determining the user links between the semantic tags and the users may be a separate and discrete determination than determining one or more of the weighted links (e.g., between individual ones of the products and the semantic tags, and/or between individual ones of the semantic tags and the products). To further illustrate, the weighted links may be used, among other information, to determine the user links; but they may be two separately performed determinations. In some implementations, determining the user links between the semantic tags, and/or determining the weighted links between the products and the semantic tags and/or between the semantic tags and the products may be performed at different times based on historical information related to search queries, users interactions with search queries users interactions with product information, user's interactions with products, and/or other information that may be continuously gathered and/or monitored.

Recommendation component 114 may be configured to determine product recommendations based on the user links between the semantic tags and the users, the weighted links between individual ones of the semantic tags and the products, and/or other information. The product recommendations may be user-specific product recommendations. In some implementations, the product recommendations determined by recommendation component 114 may take into consideration historical interactions of users with results for search queries, historical interactions of specific users with one or more products and/or product information, similarity between products (e.g., the determined degrees of similarity), and/or other historical and/or real-time information. By way of non-limiting example, a first recommendation maybe determined for the first user based on the first user link between the first user and the first semantic tag associated with the first product, a weighted link between the first semantic tag and one or more of the products, and/or other information. As such, recommendation component 114 may determine recommendations based on the semantic tags associated with a given user, and/or one or more products associated with those semantic tags (e.g., via weighted links between individual ones of the semantic tags and the products).

Figure 4:
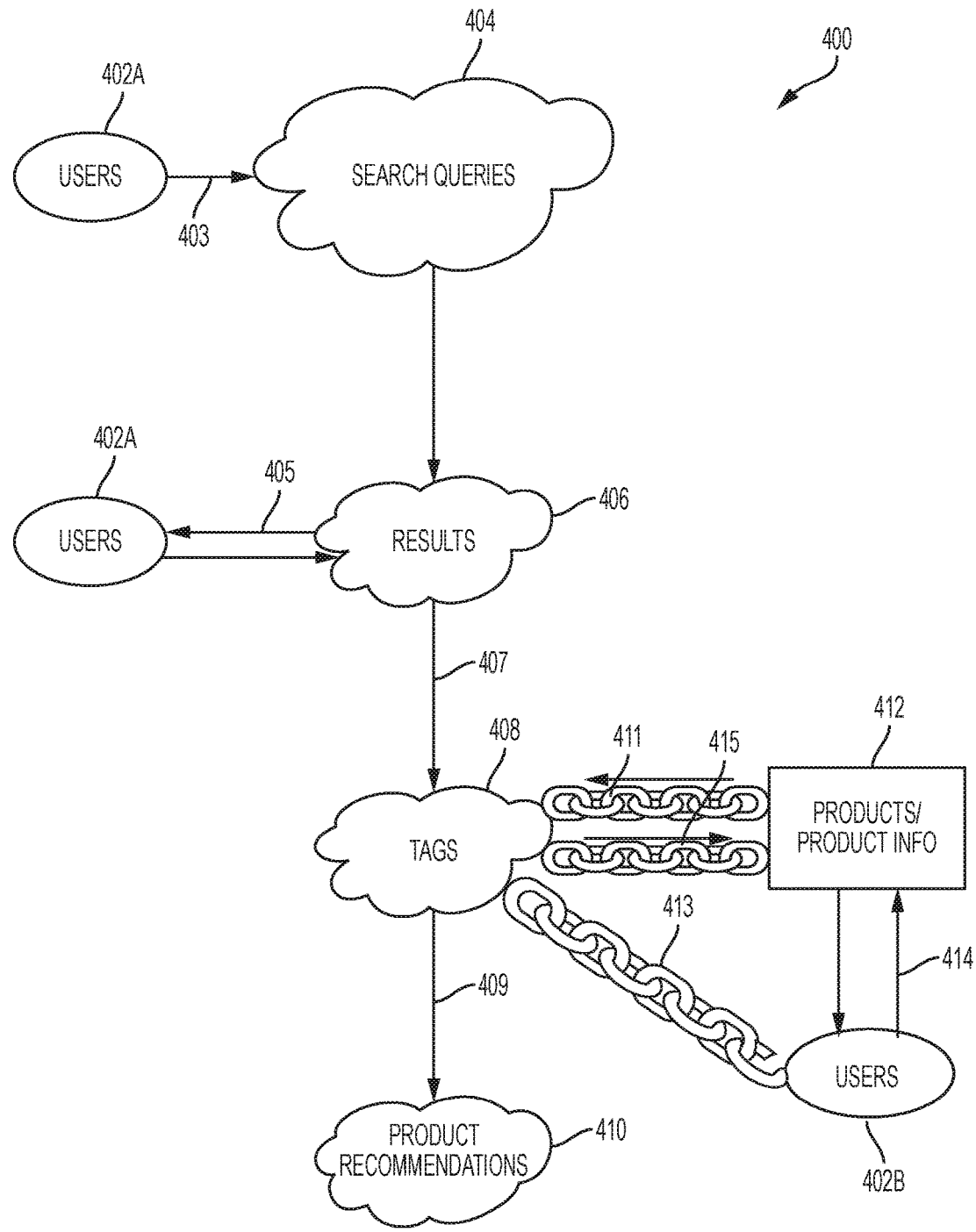
FIG. 4 illustrates an overview of a process depicting automatically tagging products for an e-commerce web application and providing product recommendations, in accordance with one or more implementations.

FIG. 4 illustrates an overview of a process 400 depicting automatically tagging products for an e-commerce web application and providing product recommendations, in accordance with one or more implementations. At step 403, users 402A may submit one or more search queries 404 via one or more client computing platforms associated with users 402A. Results for the search queries 406 may be determined and/or provided to users 402A at 605. Users 402A may interact with the results for the search queries 406 at 405. Product 412 may be associated with semantic tags 408 via weighted links 411 between individuals ones of the products 412 and the tags 408. Interactions of users 402B (which may be the same users and/or different users as users 402A) with products and/or product information 412 may be monitored at 414. User links 413 may be determined between the semantic tags 408 and users 402B. User links 413 may be determined based on weighted links 411 and users 402B interactions with products and/or product information 412 at 414. At 409, product recommendations 410 may be determined based on user links 413 and weighted links 415 between tags 408 and products 412. Process 400 may be performed by a system the same as or similar to system 100 (depicted in FIG. 1).

Figure 5:
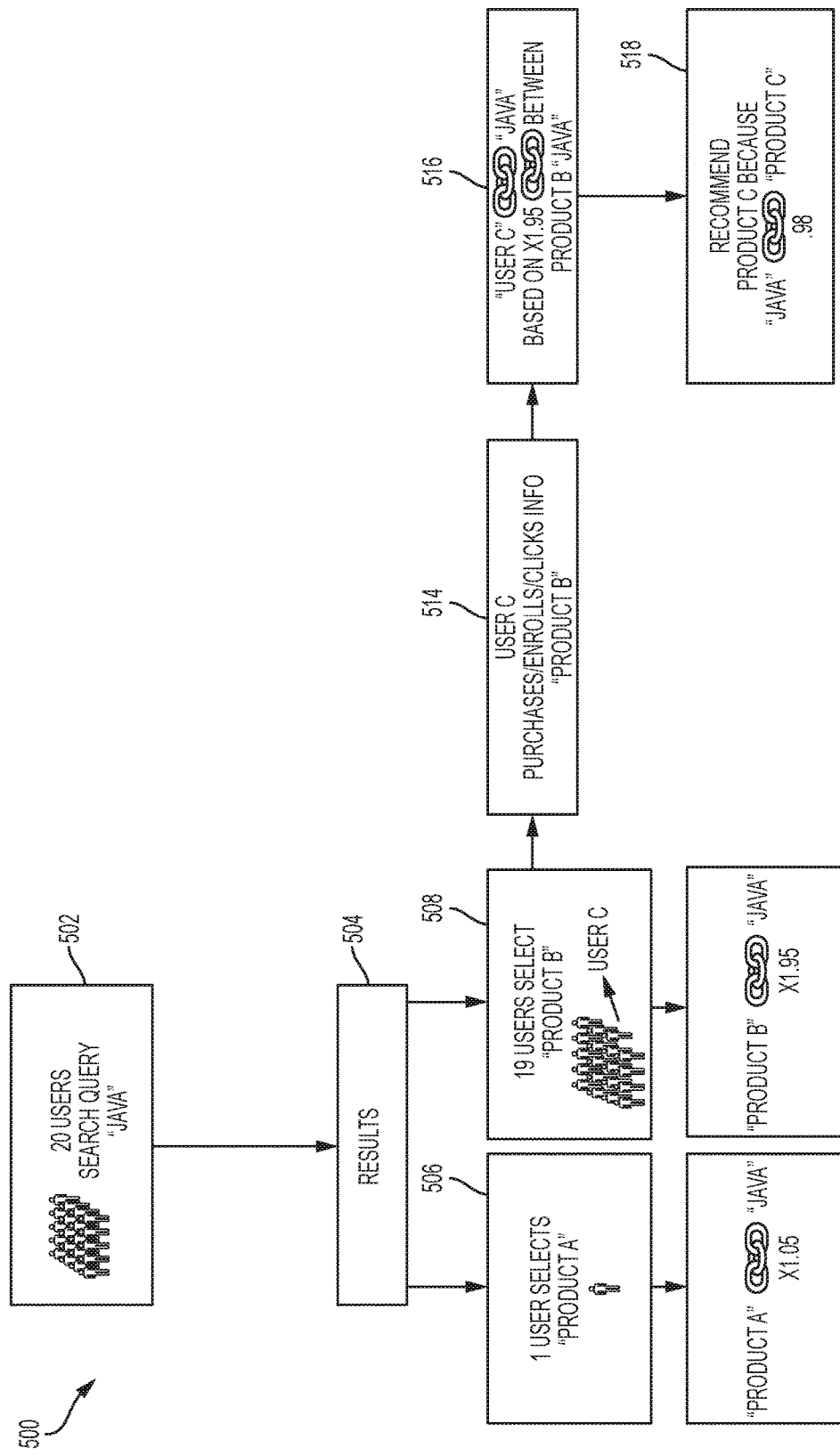
FIG. 5 illustrates an example process of determining weighted links between products and semantic tags, determining user links between users and semantic tags, and/or providing product recommendations in accordance with one or more implementations.

FIG. 5 illustrates an example process 500 determining weighted links between products and semantic tags, determining user links between users and semantic tags, and/or providing product recommendations, in accordance with one or more implementations. The steps of example process 500 presented below are intended to be illustrative and non-limiting examples. In certain implementations, example process 500 may be accomplished with one or more additional steps not described, and/or without one or more of the steps discussed. Additionally, the order in which the steps of example process 500 are illustrated in FIG. 5 and described below is not intended to be limiting.

By way of non-limiting example, as illustrated in FIG. 5, 20 users may enter search queries (at some point in historical time) including the search term "Java" at step 502. At step 504, the results for the search queries may be provided to the 20 users. At step 506, one user may click on "Product A". At step 510, "Product A" may be associated with semantic tag "Java." "Product A" may be associated with semantic tag "Java" via a weighted link having a weight of 0.05 (e.g., the weighted link may correspond and/or relate to the percentage of users that selected "Product A" compared to "Product B", based on a comparison of the interaction levels of "Product A" compared to other products included in the results for the search queries, and/or based on other information related to interactions of the users). At step 508, nineteen users, including User C, may click on "Product B." At step 512, "Product B" may be associated with semantic tag "Java." "Product B" may be associated with semantic tag "Java" via a weighted link having a weight of 0.95 (e.g., the weighted link may correspond and/or relate to the percentage of users that selected "Product B" compared to "Product A", based on a comparison of the interaction levels of Product B compared to other products included in the results for the search queries, and/or based on other information related to interactions of the users).

At step 514, User C may purchase "Product B", enroll in "Product B", complete "Product B", provide stated feedback for "Product B", and/or otherwise interact with "Product B." At step 516, a user link between "User C" and "Java" may be determined based on the 0.95 weighted link between "Product B" and "Java", and User C's interaction with "Product B." At step 518, "Product C" may be recommended to "User C" based on a weighted link (e.g., 0.98) between the semantic tag "Java" and Product C.

Returning to FIG. 1, recommendation component 114 may be configured to determine relevancy orders of the results for the search queries for individual ones of the users. Relevancy orders may affect the order, spatial arrangement, and/or manner in which the product information associated with one or more products that satisfy the search queries are presented to individual ones of the users via the client computing platforms. Recommendation component 114 may be configured to determine the relevancy orders based on one or more of (i) the weighted links between the products and the semantic tags, (ii) the weighted links between the semantic tags and the products, (iii) the user links between the semantic tags and the users, (iv) similarity between products, and/or other information. As such, providing the results for the search queries to the users via the client computing platforms may include effectuating presentation of the results for a second search query via a first client computing platform associated with the first user according to a first relevancy order determined for the first user. In some implementations, the relevancy orders may be determined by recommendation component 114 according to relevancy rules. As such, determining the order, spatial arrangement, and/or manner in which the product information associated with the one or more products that satisfy the search queries are presented to individual ones of the users may include presenting the results of the search query in accordance with the relevancy rules. An administrator may determine, input, and/or adjust the relevancy rules (e.g., via an administrator interface, etc.).

In some implementations, recommendation component 114 may be configured to identify users to recommend a product to. Recommendation component 114 may be configured to identify users to recommend a product to based on the user links between the semantic tags and the users. Recommendation component 114 may generate one or more demographic profile(s) of users linked to one or more of the semantic tags associated with a given product. One or more users that correspond to the demographic profiles may be identified. Recommendation component 114 may recommend a given product to the identified users based on their correspondence with the demographic profiles. By way of non-limiting example, responsive to user links between a first user and a second product and a second user and the second product, recommendation component 114 may generate a demographic profile based on the demographics associated with the first user and the second user. Continuing the non-limiting example, recommendation component 114 may identify users that correspond to and/or satisfy the demographics included in the demographic profile and/or may recommend the second product to the one or more users identified based on the demographic profile. In some implementations, the demographic profile may be used to provide recommendations on one or more third-party websites and/or online applications that include and/or have access to user demographic information.

In some implementations, query component 108 may be configured to effectuate presentation of a graphical user interface. The graphical user interface may be presented on one or more client computing platforms 104. For example, the graphical user interface may be used by a user to enter search terms included in a search query and/or select parameters for the search query, display the results of a search query, and/or otherwise present information associated with system 100 and/or components 106-114 to one or more users. Query component 108 may be configured to obtain information from and/or communicate with one or more of a product component 106, a semantic tag component 110, a user link component 112, a recommendation component 114, and/or other components. Query component 108 may be configured to transmit the information obtained and/or received from one or more of the system components (e.g., components 106, 110, 112, and/or 114) to one or more client computing platforms 104 for presentation. In some implementations, user interface component may produce a graphical view of one or more of the system components (e.g., components 106, 110, 112, and/or 114)) and/or information from one or more of the system components (e.g., components 106, 110, 112, and/or 114)). As such, a user may be able to interact with and/or view information associated with system 100 via information transmitted, received, and/or obtained by query component 108.

The server(s) 102, client computing platforms 104, and/or external resources 36 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 124 may be operatively linked via some other communication media.

The external resources 120 may include sources of information, hosts and/or providers of products outside of system 100, external entities participating with system 100, external entities for products and/or product platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s)

102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 14 may be configured to execute components 106-116. Processor 14 may be configured to execute components 106, 108, 110, 111, 112, 114, and/or 116, by software; hardware; firmware; some combination of software, hardware, and/or firmware; and/or other mechanisms for configuring processing capabilities on processor 124. Processor 124 may include a combination of processors, APIs, third party services, networks, and/or machine-readable instructions.

It should be appreciated that although components 106-116 are illustrated in FIG. 1 as being located and/or co-located within a particular component of system 100, in implementations in which physical processor(s) 124 include multiple processing units, one or more of components 106-118 may be located remotely from the other components. The description of the functionality provided by the different components 106-116 described herein is for illustrative purposes, and is not intended to be limiting, as any of components 106-116 may provide more or less functionality than is described. For example, one or more of components 106-116 may be eliminated, and some or all of its functionality may be incorporated, shared, integrated into, and/or otherwise provided by other ones of components 106-116. Note that physical processor(s) 124 may be configured to execute one or more additional components that may perform some or all of the functionality attributed herein to one of components 106-116.

One or more of the components of system 100 may be configured to present and/or provide an administrator interface between system 100 and a user through which the administrator can provide information to and receive information from system 100. This enables data, results, and/or instructions (e.g., determinations, selections, and/or other indications) and any other communicable items, collectively referred to as "information," to be communicated between the administrator and system 100. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 6:
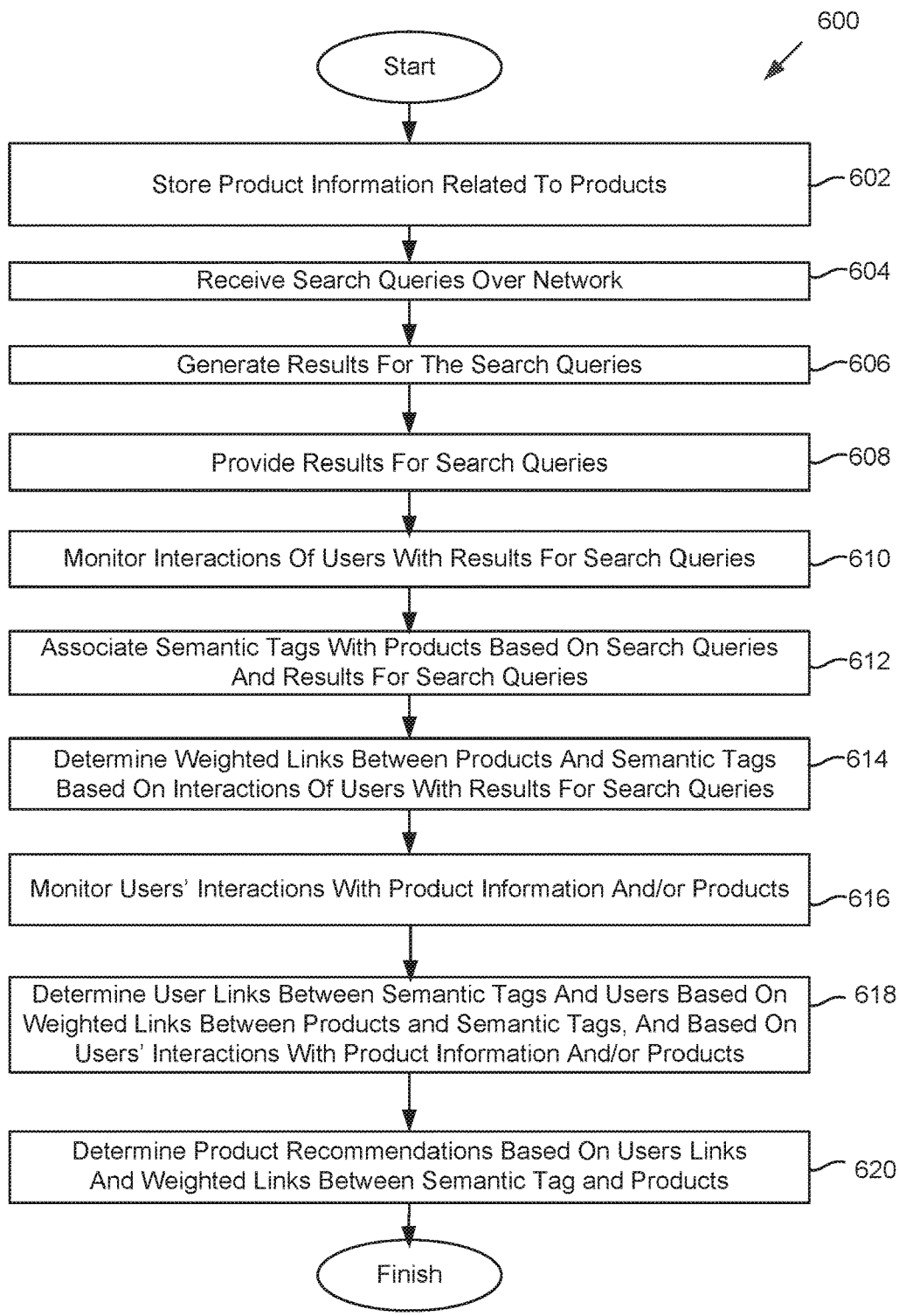
FIG. 6 illustrates a method for automatically tagging products for an e-commerce web application and providing product recommendations, in accordance with one or more implementations.

FIG. 6 illustrates an exemplary method 600 for automatically tagging products for an e-commerce web application and providing product recommendations, in accordance with one or more implementations. The operations of method 600 presented below are intended to be illustrative and non-limiting examples. In certain implementations, method 600 may be accomplished with one or more additional operations not described, and/or without one or more of the operations discussed. Additionally, the order in which the operations of method 600 are illustrated in FIG. 6 and described below is not intended to be limiting.

In certain implementations, method 600 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

Regarding method 600, at an operation 602, product information related to products may be stored. The products may be searchable via search queries. In some implementations, operation 602 is performed by a product component the same as or similar to product component 106 (shown in FIG. 1 and described herein).

At an operation 604, search queries may be received over a network. The search queries may be received over the network from one or more client computing platforms. In some implementations, operation 604 is performed by a query component the same as or similar to query component 108 (shown in FIG. 1 and described herein).

At an operation 606, results for the search queries may be generated. The results for the search queries may be generated based on the stored information related to the products. The results for the search queries may include the product information that specifies a product that satisfy the search queries. In some implementations, operation 606 is performed by a query component the same as or similar to query component 108 (shown in FIG. 1 and described herein).

At an operation 608, results for the search queries may be provided to the users. The results of the search queries may be provided to the users via the client computing platforms.

In some implementations, operation 608 is performed by a query component the same as or similar to query component 108 (shown in FIG. 1 and described herein).

At an operation 610, interactions of the users with the results for the search queries may be monitored. In some implementations, operation 610 is performed by a query component the same as or similar to query component 108 (shown in FIG. 1 and described herein).

At an operation 612, semantic tags may be associated with individual ones of the products. Semantic tags may be associated with individual ones of the products based on the search queries, the results for the search queries, and/or other information. As such, the products specified by the product information included in the results for the same or similar search queries may be associated with one or more of the same semantic tags. In some implementations, operation 612 is performed by a semantic tag component the same as or similar to semantic tag component 110 (shown in FIG. 1 and described herein).

At an operation 614, weighted links between the individual ones of the products and the semantic tags may be determined. The weighted links between individual ones of the products and the semantic may be determined based on the interactions of the users with the results for the search queries and/or other information. In some implementations, operation 614 is performed by a semantic tag component the same as or similar to semantic tag component 110 (shown in FIG. 1 and described herein).

At an operation 616, users' interactions with the product information and/or the products may be monitored. As such, a first user's interaction with first product information and/or a first product may be monitored. The first product may be associated with a first semantic tag. There may be a first weighted link between the first product and the first semantic tag. In some implementations, operation 616 is performed by a user link component the same as or similar to user link component 112 (shown in FIG. 1 and described herein).

At an operation 618, user links between the semantic tags and the users may be determined. The user links may be determined based on the weighted links between the individual ones of the products and the semantic tags, based on the users' interactions with the product information and/or the product, and/or based on other information. As such, a first user link between the first user and the first semantic tag may be determined based on the first user's interaction with the first product information and/or the first product, based on the first weighted link between the first product and the first semantic tag, and/or based on other information. In some implementations, operation 616 is performed by a user link component the same as or similar to user link component 112 (shown in FIG. 1 and described herein).

At an operation 620, product recommendations may be determined. The product recommendations may be determined based on the user links between the semantic tags and the user, based on the weighted links between the semantic tags and the products based on similarity between products that is computed using products' weighted links to the semantic tags, and/or based on other information. As such, a first recommendation may be determined for the first user based on the first user link, a weighted link between the first semantic tag and one or more of the products and/or other information. In some implementations, operation 620 is performed by a recommendation component the same as or similar to recommendation component 114 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for automatically tagging products for an e-commerce web application and providing product recommendations, the system comprising:
   one or more processors configured by machine-readable instructions to:
   store product information related to products, wherein the products are searchable via search queries;
   receive the search queries over a network from one or more client computing platforms;
   generate results for the search queries based on the stored information related to the products, wherein the results for the search queries include the product information that specifies the products that satisfy the search queries;
   provide the results for the search queries to users via the client computing platforms;
   monitor interactions of the users with the results for the search queries;
   associate semantic tags with individual ones of the products based on the search queries and the results for the search queries, such that the products specified by the product information included in the results for the search queries are associated with one or more of the semantic tags;
   determine weighted links between the individual ones of the products and the semantic tags, wherein the weighted links between individual ones of the products and the semantic tags are determined based on the interactions of the users with the results for the search queries;
   monitor interactions of the users with the product information and/or the products, such that a first user's interaction with first product information and/or a first product is monitored, wherein the first product is associated with a first semantic tag and there is a first weighted link between the first product and the first semantic tag;
   determine user links between the semantic tags and the users based on the weighted links between the individual ones of the products and the semantic tags, and based on the interactions of the users with the product information and/or the products, such that a first user link between the first user and the first semantic tag is determined based on the first user's interaction with the first product information and/or the first product, and based on the first weighted link between the first product and the first semantic tag; and
   determine the product recommendations based on the user links between the semantic tags and the users, and based on weighted links between individual ones of the semantic tags and the products, such that a first recommendation is determined for the first user based on the first user link and a weighted link between the first semantic tag and one or more of the products.

2. The system of claim 1, wherein determining the user links between the semantic tags and the users is a separate and discrete determination than determining the weighted links between the individual ones of the products and the semantic tags.

3. The system of claim 1, wherein determining the weighted links between the individual ones of the products and the semantic tags includes determining weights for the weighted links such that responsive to the first product and a second product satisfying a first search query such that first results include the first product information related to the first product and second product information related to the second product, and responsive to the interactions of the users with the first product information related to the first product being more interactive than the interactions of the users with the second product information related to the second product and/or more users interacting with the first product information related to the first product than the second product information related to the second product, the weight determined for the first weighted link between the first product and a first tag is higher than the weight determined for a second weighted link between the second product and the first tag.

4. The system of claim 1, wherein the one or more processors are further configured by machine-readable instructions to determine relevancy orders of the results for the search queries for individual ones of the users based on one or both of (i) the weighted links between the individual ones of the products and the semantic tags, and (ii) the user links between the semantic tags and the users, such that providing the results for the search queries to the users via the client computing platforms includes presenting results for a second search query via a first client computing platform associated with the first user according to a first relevancy order determined for the first user.

5. The system of claim 1, wherein associating the individual ones of the products with the semantic tags comprises determining the semantic tags, wherein the one or more processors are further configured by machine-readable instructions to:
    cluster similar ones of the search queries based on the results for the search queries, such that the results for individual ones of the search queries within a cluster are the same and/or similar, and
    generate the semantic tags based on relative importance of the search queries within the clusters, wherein the relative importance is determined based on link analysis.

6. The system of claim 1, wherein the products include online courses which a user can view, purchase, enroll-in, and/or complete.

7. The system of claim 1, wherein the interactions of the users with results for the search queries include one or more of: an impression and/or viewing of the product information related to one or more of the products that satisfy the search queries, clicking on the product and/or the product information related to one or more of the products that satisfy the search queries, enrolling and/or signing up for one or more of the products, completing and/or achieving a benchmark associated with one or more of the products, and/or purchasing one or more of the products.

8. The system of claim 1, wherein the interactions of the users with results for the search queries include one or more of: viewing the product information related to one or more of the products that satisfy the search queries but not clicking on the product information or the product, clicking on the product and/or the product information related to one or more of the products that satisfy the search queries but not purchasing the product, and/or clicking on the product and/or the product information related to one or more of the products that satisfy the search queries but not enrolling-in or signing-up for one or more of the products.

9. The system of claim 1, wherein the user's interactions of the users with the products may include one or more of: enrolling-in and/or signing up for one or more of the products, completing and/or achieving a benchmark associated with one or more of the products, purchasing one or more of the products, providing feedback for one or more of the products, returning one or more of the products, and/or enrolling-in or signing-up for a product but not completing the product.

10. The system of claim 1, wherein the one or more processors are further configured by machine-readable instructions to determine a degree of similarity between two or more products based on a semantic tag associated with the two or more products and the weighted links between the semantic tag and the two or more products.

11. The system of claim 1, wherein the one or more processors are further configured by machine-readable instructions to identify users to recommend a product to based on the user links between the semantic tags and the users, wherein identifying the users to recommend the product to includes generating a demographic profile of users linked to one or more of the semantic tags associated with the product, and identifying one or more users that correspond to the demographic profiles to recommend the product to.

12. A method for automatically tagging products for an e-commerce web application and providing product recommendations, the method being implemented by a computer system including one or more processors configured by machine-readable instructions, the method comprising:
    storing product information related to products, wherein the products are searchable via search queries;
    receiving the search queries over a network from one or more client computing platforms;
    generating results for the search queries based on the stored information related to the products, wherein the results for the search queries include the product information that specifies the products that satisfy the search queries;
    providing the results for the search queries to users via the client computing platforms;
    monitoring interactions of the users with the results for the search queries; associating semantic tags with individual ones of the products based on the search queries and the results for the search queries, such that the products specified by the product information included in the results for the search queries are associated with one or more of the semantic tags;
    determining weighted links between the individual ones of the products and the semantic tags, wherein the weighted links between individual ones of the semantic tags and individual ones of the products are determined based on the interactions of the users with the results for the search queries;
    monitoring interactions of the users with the product information and/or the products, such that a first user's interaction with first product information and/or a first product is monitored, wherein the first product is associated with a first semantic tag and there is a first weighted link between the first product and the first semantic tag;

determining user links between the semantic tags and the users based on the weighted links between the individual ones of the products and the semantic tags, and based on the interactions of the users with the product information and/or the products, such that a first user link between the first user and the first semantic tag is determined based on the first user's interaction with the first product information and/or the first product, and based on the first weighted link between the first product and the first semantic tag; and determining the product recommendations based on the user links between the semantic tags and the users, and based on weighted links between the semantic tags and the products, such that a first recommendation is determined for the first user based on the first user link and a weighted link between the first semantic tag and one or more of the products.

13. The method of claim 12, wherein determining the user links between the semantic tags and the users is a separate and discrete determination than determining the weighted links between the individual ones of the products and the semantic tags.

14. The method of claim 12, wherein determining the weighted links between the individual ones of the products and the semantic tags includes determining weights for the weighted links such that responsive to the first product and a second product satisfying a first search query such that first results include the first product information related to the first product and second product information related to the second product, and responsive to the interactions of the users with the first product information related to the first product being more interactive than the interactions of the users with the second product information related to the second product and/or more users interacting with the first product information related to the first product than the second product information related to the second product, the weight determined for the first weighted link between the first product and a first tag is higher than the weight determined for a second weighted link between the second product and the first semantic tag.

15. The method of claim 12, further comprising determining relevancy orders of the results for the search queries for individual ones of the users based on one or both of (i) the weighted links between the individual ones of the products and the semantic tags, and (ii) the user links between the semantic tags and the users, such that providing the results for the search queries to the users via the client computing platforms includes presenting results for a second search query via a first client computing platform associated with the first user according to a first relevancy order determined for the first user.

16. The method of claim 12, wherein associating individual ones of the products with the semantic tags based on the search queries and the results for the search queries further comprises determining the semantic tags, wherein determining the semantic tags includes:

clustering similar ones of the search queries based on the results for the search queries, such that the results for individual ones of the search queries within a cluster are the same and/or similar, and generating the semantic tags based on relative importance of the search queries within the clusters, wherein the relative importance is determined based on link analysis.

17. The method of claim 12, wherein the products include online courses which a user can view, purchase, enroll-in, and/or complete.

18. The method of claim 12, wherein the interactions of the users with results for the search queries include one or more of: an impression and/or viewing of the product information related to one or more of the products that satisfy the search queries, clicking on the product and/or the product information related to one or more of the products that satisfy the search queries, enrolling and/or signing up for one or more of the products, completing and/or achieving a benchmark associated with one or more of the products, and/or purchasing one or more of the products.

19. The method of claim 12, wherein the interactions of the users with results for the search queries include one or more of: viewing the product information related to one or more of the products that satisfy the search queries but not clicking on the product information or the product, clicking on the product and/or the product information related to one or more of the products that satisfy the search queries but not purchasing the product, and/or clicking on the product and/or the product information related to one or more of the products that satisfy the search queries but not enrolling-in or signing-up for one or more of the products.

20. The method of claim 12, wherein the interactions of the users with the products may include one or more of: enrolling-in and/or signing up for one or more of the products, completing and/or achieving a benchmark associated with one or more of the products, purchasing one or more of the products, providing feedback for one or more of the products, returning one or more of the products, and/or enrolling-in or signing-up for a product but not completing the product.

21. The method of claim 12, wherein the one or more processors are further configured by machine-readable instructions to determine a degree of similarity between two or more products based on a semantic tag associated with the two or more products and the weighted links between the semantic tag and the two or more products.

22. The method of claim 21, further comprising:
identifying users to recommend a product to based on the user links between the semantic tags and the users, wherein identifying the users to recommend the product to includes generating a demographic profile of users linked to one or more of the semantic tags associated with the product, and identifying one or more users that correspond to the demographic profiles to recommend the product to.

\* \* \* \* \*